3,557,253
METHOD OF PRODUCING VINYL CHLORIDE RESINS
Katsumi Sugimoto and Yoshio Kondo, Tokyo, and Sachio Fukui, Yokohama, Japan, assignors to The Japanese Geon Company, Ltd., Tokyo, Japan, a corporation of Japan
No Drawing. Filed Oct. 10, 1967, Ser. No. 674,099
Claims priority, application Japan, Oct. 14, 1966, 41/67,277
Int. Cl. C08f 25/00
U.S. Cl. 260—878        14 Claims

ABSTRACT OF THE DISCLOSURE

A method of producing vinyl chloride resins which comprises graft polymerizing to a mixture of (1) at least one elastomer selected from the group consisting of the ethylene-vinyl ester copolymers, the ethylene-acrylic acid ester copolymers and the ethylene-vinyl ester acrylic acid ester ternary copolymers, and (2) at least one elastomer selected from the group consisting of the ethylene-propylene copolymers, the ethylene-propylene-nonconjugated diolefin ternary copolymers, butyl rubber and chlorinated butyl rubber, vinyl chloride or a monomeric mixture of vinyl chloride with a small amount of one or more co-monomers, said first and second-named elastomers and said monomer being used in the amounts, on a weight basis, of 1 to 15%, 2 to 15% and 97 to 70%, respectively.

---

This invention relates to vinyl chloride resins having superior impact resistance at room and low temperatures as well as excellent weatherability and improved processability. More particularly, this invention relates to a method of producing such vinyl chloride resin compositions by graft polymerizing vinyl chloride monomer, which may contain a small amount of a co-monomer, to a mixture consisting of (1) at least one elastomer selected from the group consisting of the ethylene-vinyl ester copolymers, the ethylene acrylic acid ester copolymers and the ethylene-vinyl ester-acrylic acid ester ternary copolymers and (2) at least one elastomer selected from the group consisting of the ethylene-propylene copolymer, the etheylene-propylene-nonconjugated diolefin ternary copolymers, butyl rubber and chlorinated butyl rubber.

As a method of producing by graft polymerization impact-resistant vinyl chloride resins having excellent weatherability, the methods known heretofore were those wherein vinyl chloride was graft polymerized to the nondiene type elastomers such as the ethylene-vinyl ester copolymers, ethylene-acrylic acid ester copolymers, ethylene-propylene copolymer and the ethylene-propylene-nonconjugated diolefin ternary copolymers.

However, the products obtained by these methods had various shortcomings and hence were not necessarily satisfactory. For example, the resins obtained by graft polymerizing vinyl chloride to the ethylene-vinyl ester copolymers or the ethylene-acrylic acid ester copolymers not only showed a considerable enhancement of their impact resistance at room temperature but also were improved in their processability, since these elastomers were compatible to a certain extent with polyvinyl chloride. However, the second order transition point of these type of elastomer being in the neighborhood of —20° C., they lose their properties as an elastomer abruptly at below about 0° C. and hence these resins demonstrate at, say, —5° C. an impact resistance which is only about equal to that of a polymer composed of vinyl chloride alone. On the other hand, none of the resins obtained by graft polymerizing vinyl chloride to the elastomers having a second order transition point in the neighborhood of —60 to —50° C., such as the ethylene-propylene copolymers, the ethylene-propylene-nonconjugated diolefin ternary copolymers, butyl rubber and chlorinated butyl rubber, manifest a satisfactory impact resistance, nor is their processability fully improved, since the elastomers are not compatible at all with polyvinyl chloride. If the elastomer content is increased for offsetting the foregoing fault, drawbacks such as a decline in the softening temperature of the graft polymer and a rise in its cost are brought about.

It is therefore a primary object of this invention to provide vinyl chloride resins which possess superior impact resistance at room and low temperatures as well as excellent weatherability.

Another object of the invention is to provide a rigid vinyl chloride resin which has improved processability in addition to the foregoing properties.

Other objects and advantages of this invention will be apparent from the following description.

These objects of the invention can be achieved by graft polymerizing to a trunk elastomer consisting of both the elastomers (1) and (2), as hereinbefore described, vinyl chloride or a monomeric mixture of vinyl chloride with a small amount of one or more comonomers copolymerizable therewith.

The foregoing elastomer (1) is one whose compatibility with polyvinyl chloride is good, though its second order transition point is relatively high. On the other hand, the foregoing elastomer (2) is one whose compatibility with polyvinyl chloride is poor, though its second order transition point is very low. According to this invention, the following effects are imparted to the graft polymer by the conjoint use of such elastomers (1) and (2). Improving effects of melt flowability and compatibility with polyvinyl chloride which are not possessed by the elastomer (2) are imparted to the graft polymer by utilizing the properties possessed by the elastomer (1), whereas the reinforcing effects at low temperatures which is not possessed by the elastomer (1) is imparted to the graft polymer by utilizing the fact that the second order transition point of the elastomer (2) is low.

The elastomer (1), as previously noted, are copolymers of (A) ethylene and (B) vinyl ester and/or acrylic acid ester. The vinyl ester is included one or more of the monovinyl ester of a saturated carboxylic acid having 2–12 carbon atoms. The acrylic acid ester is included one or more of the ester consisting of a monohydric saturated alcohol having 1–11 carbon atoms and an acrylic acid. As (B), one of the components making up these copolymeric elastomers, included are vinyl acetate, vinyl propionate, vinyl laurate, vinyl benzoate, methyl acrylate, ethyl acrylate and 2-ethylhexyl acrylate. In order that the elastomer (1) can perform its role of providing the trunk elastomer with the property whereby it becomes compatible with polyvinyl chloride, the content of the compound (B) in the elastomer should be from 20 to 90% by weight, and preferably 30 to 80% by weight. In other words, the ethylene content of the elastomer (1) should be from 10 to 80% by weight, and preferably 20 to 70% by weight.

The elastomer (2), as previously noted, is selected from the group consisting of the ethylene-propylene copolymers, the ethylene-propylene-nonconjugated diolefin ternary copolymers, butyl rubber and chlorinated butyl rubber. As the ethylene-propylene copolymer, that in which the ethylene content is about 30 to 70% by weight is preferred. The ethylene-propylene-nonconjugated diolefin ternary copolymers are exemplified by those elastomers obtained by copolymerizing ethylene and propylene with a small amount of nonconjugated diolefin, such as dicyclopentadiene, norbornadiene vinyl cyclohexene and 1,4-hexadiene, the ethylene content of which elastomers are about 30 to 70% by weight. As the butyl rubber, the copolymer of isobutylene and a small amount of a diolefin, especially isoprene, is suitable; whereas as the chlorinated butyl rubber, a chlorinated product of the foregoing butyl rubber having at most 10% by weight of chlorine is conveniently used. All of these elastomers are readily available commercially.

As examples of the co-monomers which are grafted to these elastomers (1) and (2) along with the vinyl chloride, included are the vinyl esters such as vinyl acetate, vinyl propionate, vinyl laurate and vinyl benzoate; the acrylic or methacrylic acid esters such as ethyl acrylate, isopropyl acrylate, butyl acrylate, octyl acrylate, ethyl methacrylate, butyl methacrylate, hexyl methacrylate, nonyl methacrylate and cyclohexyl methacrylate; the maleic and fumaric acid esters such as diethyl maleate, dibutyl maleate, dimethyl fumarate and dibutyl fumarate; the vinyl ethers such as vinyl methyl ether, vinyl butyl ether, vinyl octyl ether, vinyl cyclohexyl ether and vinyl phenyl ether; vinyl cyanides such as acrylonitrile and methacrylonitrile; the monoolefins such as ethylene, propylene, n-butene and isobutene; the vinyl halides other than vinyl chloride, such as vinyl bromide and vinylidenes such as vinylidene chloride. These co-monomers can be used in small amounts on the order usually used for modifying the vinyl chloride resins, for example, up to about 20% by weight of the vinyl chloride.

The proportion in which the elastomer (1) is contained in the graft polymer should be 1 to 15% by weight, and preferably 2 to 10% by weight. If the amount of the elastomer (1) is less than 1% by weight, it is not effective in improving the impact resistance and processability of the product, whereas if the amount exceeds 15% by weight, it is unsuitable for use in the rigid zone. The proportion of the elastomer (2) in the end product must be 2 to 15% by weight, and preferably 3 to 10% by weight, in order that it may fulfill the role of the impartation of reinforcing effects at low temperatures to polyvinyl chloride. Hence, according to this invention, 95 to 70% by weight, and preferably 95 to 80% by weight, of vinyl chloride or monomeric mixture of vinyl chloride with a small amount of co-monomer is grafted to 1 to 15% by weight, preferably 2 to 10% by weight, of the elastomer (1) and 2 to 15% by weight, preferably 3 to 10% by weight, of the elastomer (2). Especially good results are obtained when the use of elastomer (1) to the elastomer (2) is in a ratio by weight of from 1:15 to 7.5:1, preferably from 1:5 to 3.5:1.

The polymerization reaction used in the invention method may be either the suspension or solution polymerization method which uses as catalyst organic peroxides, such as benzoyl peroxide, lauroyl peroxide and di-tertiary-butyl peroxide, and the azo compounds, such as $\alpha,\alpha'$-azobisisobutylronitrile. Further, also usable is the emulsion polymerization method which uses a water-soluble catalyst such as hydrogen peroxide, ammonium persulfate and potassium persulfate. In the suspension polymerization method the conventional suspension dispersing agents having a protective colloidal property, such as polyvinyl alcohol, cellulose derivatives, gelatin or the copolymer of vinyl acetate and maleic anhydride, are used. In the solution polymerization method the solvents having a relatively small chain transfer coefficient, such as the petroleum hydrocarbons as butane, pentane, n-hexane and n-heptane or the aromatic hydrocarbons as benzene and toluene, are used to advantage. On the other hand, as the emulsifier in the emulsion polymerization method, the anion surfactants such as higher alcohol sulfates, alkylallylsulfonates and fatty acid alkali salts, and the nonion surfactants such as polyoxyethylene alkyl ethers, polyoxyethylene alkyl esters and sorbitan esters are used singly or in combinations of two or more thereof.

The invention method may be carried out to advantage by dissolving the elastomers (1) and (2) in vinyl chloride along with a catalyst which is soluble in the latter, dispersing the so obtained solution in an aqueous medium using a suitable dispersing agent such gelatin, polyvinyl alcohol or methyl cellulose, and thereafter carrying out the suspension polymerization of the vinyl chloride under reaction conditions.

The polymerization catalyst is used in an amount ranging usually from 0.05% to 3% based on the vinyl chloride being copolymerized. As the polymerization temperature, that usually used in polymerizing vinyl chloride, i.e. a temperature 20–80° C., is used.

As hereinbefore described, vinyl chloride resins having room and low temperature impact resistance, weatherability and processability superior to the instance where vinyl chloride has been graft polymerized to the elastomers (1) or (2) independently, can be obtained by the invention mtehod. Further, even though the vinyl chloride resins obtained by graft polymerizing vinyl chloride to the elastomers (1) and (2) independently are subsequently mixed, the resultant resins are not excellent in impact resistance at room and low temperatures and processability as in this invention.

The resins according to the present invention are especially suitable for preparation of rigid or semi-rigid pipes, plates, sheets, films, tiles, profile extrudates or shaped articles by extrusion, injection, calendering or vacuum forming method.

The following non-limitative examples are given to illustrate the invention specifically.

EXAMPLE 1

A mixture according to the following recipe was charged to a stainless steel autoclave equipped with a stirrer. After the mixture was thoroughly stirred at room temperature, it was reacted for 18 hours at 60° C. to complete the polymerization.

| | Parts by weight |
|---|---|
| Vinyl chloride | 94 |
| Ethylene-vinyl acetate copolymer (Levapren 450, vinyl acetate content about 45% by weight) | 3 |
| Ethylene-propylene copolymer (Dutral N, ethylene content about 45% by weight) | 3 |
| Water | 450 |
| Polyvinyl alcohol | 0.3 |
| Lauroyl peroxide | 0.1 |
| Polyoxyethylene sorbitan monolaurate | 0.01 |

The resulting suspension product was filtered and dried to yield a granular grafted product.

100 parts of this product was then compounded with 3 parts of dibutyl tin maleate and 0.5 part of butyl stearate in order to test its impact resistance and flowability. The impact strength was adopted as the parameter of the impact resistance. The impact strength was measured with a Charpy impact tester at 25° C. and −10° C., using as the test specimen pieces (with a notch) cut from a sheet obtained by compounding the aforesaid product for 10 minutes with hot rolls of 150° C. and thereafter pressing into a sheet at a temperature of 160° C. and a pressure of 200 kg./cm.$^2$. The flow temperature was adopted as the parameter of the flowability. The flow temperature, which was measured using the Koka type flow tester (the nozzle being a cylindrical tube 10 mm. in length and 1 mm. in diameter), is the temperature at which the viscosity shows $10^5$ poises when the compound was extruded under the conditions of a rate of temperature rise of 3° C. per minute and a load of 300 kg./cm.$^2$. The measurement value obtained are shown in Table I. By way of comparison, the Charpy impact strength and the flow temperature of the product obtained by graft polymerizing vinyl chloride to an ethylene-propylene copolymer (Control 1), the product obtained by graft polymerizing vinyl chloride to an ethylene-vinylacetate copolymer (Control 2), and of polyvinyl chloride (Control 3) are also shown in Table I.

TABLE I

| Reaction system | | Composition, parts by weight | Charpy impact strength kg.-cm./cm.[2] | | Flow temperature, °C. |
|---|---|---|---|---|---|
| | | | 25° C. | −10° C. | |
| Example 1 | Vinyl chloride | 94 | 22.7 | 9.2 | 168 |
| | Ethylene-vinyl acetate copolymer | 3 | | | |
| | Ethylene-propylene copolymer | 3 | | | |
| Control 1 | Vinyl chloride | 94 | 7.4 | 4.3 | 178 |
| | Ethylene-propylene copolymer | 6 | | | |
| Control 2 | Vinyl chloride | 94 | 22.3 | 4.4 | 168 |
| | Ethylene-vinyl acetate copolymer | 6 | | | |
| Control 3 | Vinyl chloride | 100 | 4.0 | 4.0 | 185 |

EXAMPLES 2–4

The polymerization was carried out under identical conditions as in Example 1, except that 94 parts of vinyl chloride monomer were graft polymerized to a mixture of 2 parts of an ethylene-vinyl acetate copolymer and 4 parts of an ethylene-propylene copolymer (Example 2). The Charpy impact values and flow temperature of the resulting product are shown in Table II. Further, the Charpy impact strength and the flow temperature of the product obtained by graft polymerizing 94 parts of vinyl chloride to a mixture of 4 parts of an ethylene-vinyl acetate copolymer and 2 parts of an ethylene-propylene copolymer (Example 3) and the product obtained by graft polymerizing 94 parts of vinyl chloride to a mixture of one part of an ethylene-vinyl acetate copolymer and 5 parts of an ethylene-propylene copolymer (Example 4) are also shown in Table II.

TABLE II

| Reaction system | | Composition, parts by weight | Charpy impact strength kg.-cm./cm.[2] | | Flow temperature, °C. |
|---|---|---|---|---|---|
| | | | 25° C. | −10° C. | |
| Example 2 | Vinyl chloride | 94 | 19.6 | 11.8 | 170.5 |
| | Ethylene-vinyl acetate copolymer | 2 | | | |
| | Ethylene-propylene copolymer | 4 | | | |
| Example 3 | Vinyl chloride | 94 | 21.4 | 5.5 | 168 |
| | Ethylene-vinyl acetate copolymer | 4 | | | |
| | Ethylene-propylene copolymer | 2 | | | |
| Example 4 | Vinyl chloride | 94 | 9.1 | 6.0 | 175 |
| | Ethylene-vinyl acetate copolymer | 1 | | | |
| | Ethylene-propylene copolymer | 5 | | | |
| Control 3 | Vinyl chloride | 100 | 4.0 | 4.0 | 185 |

EXAMPLE 5

Except that a monomeric mixture of 91 parts of vinyl chloride monomer and 3 parts of 2-ethylhexylvinyl ether was graft polymerized to a mixture of 2 parts of an ethylene-vinyl acetate copolymer and 4 parts of an ethylene-propylene copolymer, the procedure described in Example 1 was otherwise followed. The Charpy impact values and the flow temperature of the resulting product are shown in Table III. In Table III are also shown by way of comparison the Charpy impact strength and the flow temperature of the product obtained by graft polymerizing the foregoing monomeric mixture to 6 parts of an ethylene-vinyl acetate copolymer (Control 4), the product obtained by graft polymerizing the same monomeric mixture to 6 parts of an ethylene-propylene copolymer (Control 5) and the copolymeric product obtained from the foregoing monomeric mixture alone (Control 6).

TABLE III

| Reaction system | | Composition, parts by weight | Charpy impact strength, kg.-cm./cm.[2] | | Flow temperature, °C. |
|---|---|---|---|---|---|
| | | | 25° C. | −10° C. | |
| Example 5 | Vinyl chloride | 91 | 19.4 | 10.9 | 144 |
| | 2-ethylhexylvinyl ether | 3 | | | |
| | Ethylene-vinyl acetate copolymer | 2 | | | |
| | Ethylene-propylene copolymer | 4 | | | |
| Control 4 | Vinyl chloride | 91 | 21.6 | 4.0 | 142 |
| | 2-ethylhexylvinyl ether | 3 | | | |
| | Ethylene-vinyl acetate copolymer | 6 | | | |
| Control 5 | Vinyl chloride | 91 | 7.0 | 4.2 | 160 |
| | 2-ethylhexylvinyl ether | 3 | | | |
| | Ethylene-propylene copolymer | 6 | | | |
| Control 6 | Vinyl ether | 96.8 | 3.7 | 3.7 | 170 |
| | 2-ethylhexylvinyl ether | 3.2 | | | |

EXAMPLE 6

The procedure in Example 1 was repeated except that 94 parts of vinyl chloride were graft polymerized to a mixture of 2 parts of an ethylene-ethyl acrylate copolymer (ethyl acrylate content 40% by weight) and 4 parts of an ethylene-propylene copolymer. The impact strength and the flow temperature of the resulting product are shown in Table IV. Further, in Table IV are also shown by way of comparison the data relative to a product obtained by graft polymerizing 94 parts of vinyl chloride to 6 parts of an ethylene-ethyl acrylate copolymer (Control 7) and also again the data of the previously presented Controls 1 and 3.

TABLE IV

| Reaction system | | Composition, parts by weight | Charpy impact strength, kg.-cm./cm.² | | Flow temperature, °C. |
|---|---|---|---|---|---|
| | | | 25° C. | −10° C. | |
| Example 6 | Vinyl chloride | 94 | 17.3 | 8.4 | 166 |
| | Ethylene-ethyl acrylate copolymer | 2 | | | |
| | Ethylene-propylene copolymer | 4 | | | |
| Control 7 | Vinyl chloride | 94 | 18.4 | 4.0 | 164 |
| | Ethylene-ethyl acrylate copolymer | 6 | | | |
| Control 1 | Vinyl chloride | 94 | 7.4 | 4.3 | 178 |
| | Ethylene-propylene copolymer | 6 | | | |
| Control 3 | Vinyl chloride | 100 | 4.0 | 4.0 | 185 |

EXAMPLE 7

The procedure described in Example 1 was followed, except that 94 parts of vinyl chloride were graft polymerized to a mixture of 2 parts of an ethylene-vinyl acetate copolymer and 4 parts of butyl rubber. The Charpy impact strength and the flow temperature of the resulting product are shown in Table V. In Table V are also shown the data relative to a product obtained by graft polymerizing 94 parts of vinyl chloride to 6 parts of butyl rubber (Polysar 101, Control 8) and also again by way of comparison the data of the previously presented Controls 2 and 3.

TABLE V

| Reaction system | | Composition, parts by weight | Charpy impact strength, kg.-cm./cm.² | | Flow temperature, °C. |
|---|---|---|---|---|---|
| | | | 25° C. | −10° C. | |
| Example 7 | Vinyl chloride | 94 | 18.2 | 9.4 | 170 |
| | Ethylene-vinyl acetate copolymer | 2 | | | |
| | Butyl rubber | 4 | | | |
| Control 8 | Vinyl chloride | 94 | 6.5 | 4.1 | 178 |
| | Butyl rubber | 6 | | | |
| Control 2 | Vinyl chloride | 94 | 22.3 | 4.4 | 168 |
| | Ethylene-vinyl acetate copolymer | 6 | | | |
| Control 3 | Vinyl chloride | 100 | 4.0 | 4.0 | 185 |

EXAMPLE 8

Except that 94 parts of vinyl chloride were graft polymerized to a mixture of 2 parts of an ethylene-vinyl acetate copolymer and 4 parts of chlorinated butyl rubber (Esso Butyl HT, chlorine content 3% by weight), the operation was otherwise carried out as in Example 1. The Charpy impact strength and the flow temperature of the resulting product are shown in Table VI. In Table VI are also shown the data relative to a product obtained by graft polymerizing 94 parts of vinyl chloride to 6 parts of the foregoing chlorinated butyl rubber (Control 9) and again by way of comparison the data of the previously presented Controls 2 and 3.

TABLE VI

| Reaction system | | Composition, parts by weight | Charpy impact strength, kg.-cm./cm.² | | Flow temperature, °C. |
|---|---|---|---|---|---|
| | | | 25° C | −10° C. | |
| Example 8 | Vinyl chloride | 94 | 20.3 | 9.6 | 168 |
| | Ethylene-vinyl acetate copolymer | 2 | | | |
| | Chlorinated butyl rubber | 4 | | | |
| Control 9 | Vinyl chloride | 94 | 8.1 | 5.2 | 175.5 |
| | Chlorinated butyl rubber | 6 | | | |
| Control 2 | Vinyl chloride | 94 | 22.3 | 4.4 | 168 |
| | Ethylene-vinyl acetate copolymer | 6 | | | |
| Control 3 | Vinyl chloride | 100 | 4.0 | 4.0 | 185 |

EXAMPLE 9

The procedure in Example 2 was repeated except that an ethylene-propylene-dicyclopentadiene terpolymer (Royalene 201, ethylene/propylene 50/50, iodine value 11) was adopted instead of the ethylene-propylene copolymer. The Charpy impact strength at 25° C. and −10° C. was 20.7 and 11.4 kg.-cm./cm.² respectively and the flow temperature was 173° C.

We claim:

1. A method of producing vinyl chloride resins which comprises graft polymerizing in the presence of a free-radical catalyst a monomer component selected from vinyl chloride and a monomeric mixture of vinyl chloride with up to 20% by weight, based on the vinyl chloride content, of one or more comonomers, to a mixture of (1) at least one elastomer selected from the group consisting of ethylene-vinyl ester copolymers, ethylene-acrylic acid ester copolymers and ethylene-vinyl ester-acrylic acid ester terpolymers, and (2) at least one elastomer selected from the group consisting of ethylene-propylene copolymers, ethylene-propylene-nonconjugated diolefin terpolymers, butyl rubber and chlorinated butyl rubber, the amounts of elastomer (1), elastomer (2) and said monomer component being on a weight basis, 1 to 15%, 2 to 15% and 97 to 70%, respectively.

2. The method of claim 1 wherein elastomers (1) and (2) are present in a ratio, on a weight basis, ranging between 1:15 and 7.5:1.

3. The method of claim 1 wherein the ethylene content of elastomer (1) is 10 to 80% by weight.

4. The method of claim 1 wherein elastomer (2) is an ethylene-propylene copolymer having an ethylene content of 30 to 70% by weight.

5. The method of claim 1 wherein elastomer (2) is an ethylene-propylene-nonconjugated diolefin terpolymer having an ethylene content of 30 to 70% by weight.

6. The method of claim 1 wherein said graft polymerization is carried out in a suspended state.

7. The method of claim 1 wherein said graft polymerization is carried out by dissolving elastomers (1) and (2) in the monomer component, dispersing the obtained solution in an aqueous medium and thereafter carrying out suspension polymerization.

8. A vinyl chloride resin composition obtained by graft polymerizing in the presence of a free-radical catalyst a monomer component selected from vinyl chloride and a monomeric mixture of vinyl chloride with up to 20% by weight, based on the vinyl chloride content, of one or more comonomers, to a mixture of (1) at least one elastomer selected from the group consisting of ethylene-vinyl ester copolymers, ethylene-acrylic acid ester copolymers and ethylene-vinyl ester-acrylic acid ester terpolymers and (a) at least one elastomer selected from the group consisting of ethylene-propylene copolymers, ethylene-propylene-nonconjugated diolefin terpolymers, butyl rubber and chlorinated butyl rubber, said elastomers (1) and (2) and said monomer component being present in the amounts, on a weight basis, of 1 to 15%, 2 to 15% and 97 to 70%, respectively.

9. The composition of claim 8 wherein said elastomers (1) and (2) are present in a ratio, on a weight basis, ranging between 1:15 and 7.5:1.

10. The composition of claim 8 wherein the ethylene content of elastomer (1) is 10 to 80% by weight.

11. The composition of claim 8 wherein elastomer (2) is an ethylene-propylene copolymer having an ethylene content of 30 to 70% by weight.

12. The composition of claim 8 wherein elastomer (2) is an ethylene-propylene-nonconjugated diolefin terpolymer having an ethylene content of 30 to 70% by weight.

13. The composition of claim 8 wherein said graft polymerization is carried out in a suspended state.

14. The composition of claim 8 wherein said graft polymerization is carried out by dissolving the said elastomers (1) and (2) in the monomer component, dispersing the obtained solution in an aqueous medium and thereafter carrying out suspension polymerization.

References Cited

UNITED STATES PATENTS

| | | | |
|---|---|---|---|
| 3,271,477 | 9/1966 | Kresge | 260—877 |
| 3,288,739 | 11/1966 | Natta et al. | 260—29.6 |
| 3,352,054 | 12/1967 | Hardt et al. | 260—878 |
| 3,435,096 | 3/1969 | Limbert et al. | 260—878 |

JOSEPH L. SCHOFER, Primary Examiner

S. M. LEVIN, Assistant Examiner

U.S. Cl. X.R.

260—45.75, 80.78, 80.2, 85.3, 86.7, 87.3, 88.2, 92.8